United States Patent
Far et al.

(10) Patent No.: US 9,874,094 B2
(45) Date of Patent: Jan. 23, 2018

(54) IDENTIFYING FORMATION LAYER BOUNDARIES ON WELL LOG MEASUREMENTS

(71) Applicant: Landmark Graphics Corporation, Houston, TX (US)

(72) Inventors: Mehdi Eftekhari Far, Humble, TX (US); John Andrew Quirein, Georgetown, TX (US); Natasa Mekic, Spring, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 15/026,564

(22) PCT Filed: Jun. 26, 2015

(86) PCT No.: PCT/US2015/037992
§ 371 (c)(1),
(2) Date: Mar. 31, 2016

(87) PCT Pub. No.: WO2016/209265
PCT Pub. Date: Dec. 29, 2016

(65) Prior Publication Data
US 2017/0183962 A1    Jun. 29, 2017

(51) Int. Cl.
G06F 17/10 (2006.01)
E21B 49/00 (2006.01)
E21B 49/08 (2006.01)

(52) U.S. Cl.
CPC ............. *E21B 49/00* (2013.01); *G06F 17/10* (2013.01); *E21B 49/087* (2013.01)

(58) Field of Classification Search
None
See application file for complete search history.

(56) References Cited

U.S. PATENT DOCUMENTS

| | | | |
|---|---|---|---|
| 4,585,939 | A | 4/1986 | Arnold et al. |
| 6,466,872 | B1 | 10/2002 | Kriegshauser et al. |
| 6,856,909 | B2 | 2/2005 | Banning-Geertsma |
| 2006/0186887 | A1 | 8/2006 | Strack et al. |
| 2008/0015780 | A1 | 1/2008 | Dirmi et al. |

OTHER PUBLICATIONS

International Search Report and Written Opinion dated Feb. 23, 2016 for International Application No. PCT/US2015/037992, 10 pages.
Hou, Junsheng et al., A New Multi-Frequency Triaxial Array Induction Tool for Enhancing Evaluation of Anisotropic Formations and Its Field Testing, SPWLA 54th Annual Logging Symposium, Jun. 22-26, 2013, 17 pages.
Davis, Aaron C., et al., Derivative Analysis for Layer Selection of Geophysical Borehole Logs, Computers & Geosciences 60 (2013) 34-40, 7 pages.

*Primary Examiner* — Kamini S Shah
*Assistant Examiner* — David M Rogers
(74) *Attorney, Agent, or Firm* — Polsinelli PC (57) ABSTRACT

Systems and methods for identifying formation layer boundaries on well log measurements using a second derivative of the last iteratively smoothed well log measurements and a fluctuation index to determine the extent of smoothing.

18 Claims, 12 Drawing Sheets

IDENTIFYING FORMATION LAYER BOUNDARIES ON WELL LOG MEASUREMENTS

This application claims the priority of PCT Patent Application No. PCT/US15/37992, filed on Jun. 26, 2015, which is incorporated herein by reference.

FIELD OF THE DISCLOSURE

The present disclosure generally relates to systems and methods for identifying formation layer boundaries on well log measurements. More particularly, the present disclosure relates to systems and methods for identifying formation layer boundaries on well log measurements using a second derivative of the last iteratively smoothed well log measurements and a fluctuation index to determine the extent of smoothing.

BACKGROUND

Detection of formation layer boundaries on well log measurements is required for interpretation, modeling and inversion tasks. Existing methods for automatic formation boundary detection, which are mostly based on data variance and frequency analysis, are not robust and effective. Conventional formation layer boundary detection on well log measurements therefore, is often manually performed and time consuming. These disadvantages are compounded in situations involving multi-sensor data and multi-well data.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for identifying formation layer boundaries on well log measurements using a second derivative of the last iteratively smoothed well log measurements and a fluctuation index to determine the extent of smoothing.

In one embodiment, the present disclosure includes a method for identifying formation layer boundaries on well log measurements, which comprises: a) computing a first derivative using one of a first derivative of the well log measurements and last smoothed well log measurements; b) computing a fluctuation index by dividing the first derivative by the number of data points in the well log measurements; c) smoothing one of the well log measurements and the last smoothed well log measurements using a computer processor; d) repeating steps a)-c) until the fluctuation index is less than a predetermined threshold; e) computing a second derivative using one of a second derivative of the well log measurements and the last smoothed well log measurements at each sampled point; f) identifying each second derivative with a zero value, which represents an inflection point; and g) displaying a formation layer boundary on one of the well log measurements and the last smoothed well log measurements at each identified inflection point.

In another embodiment, the present disclosure includes a non-transitory program carrier device tangibly carrying computer executable instructions for identifying formation layer boundaries on well log measurements, the instructions being executable to implement: a) computing a first derivative using one of a first derivative of the well log measurements and last smoothed well log measurements; b) computing a fluctuation index by dividing the first derivative by the number of data points in the well log measurements; c) smoothing one of the well log measurements and the last smoothed well log measurements; d) repeating steps a)-c) until the fluctuation index is less than a predetermined threshold; e) computing a second derivative using one of a second derivative of the well log measurements and the last smoothed well log measurements at each sampled point; f) identifying each second derivative with a zero value, which represents an inflection point; and g) displaying a formation layer boundary on one of the well log measurements and the last smoothed well log measurements at each identified inflection point.

In yet another embodiment, the present disclosure includes a non-transitory program carrier device tangibly carrying computer executable instructions for identifying formation layer boundaries on well log measurements, the instructions being executable to implement: a) computing a first derivative using one of a first derivative of the well log measurements and last smoothed well log measurements; b) computing a fluctuation index by dividing the first derivative by the number of data points in the well log measurements; c) smoothing one of the well log measurements and the last smoothed well log measurements; d) repeating steps a)-c) until the fluctuation index is less than a predetermined threshold, wherein the predetermined threshold represents an optimal formation layer boundary resolution; e) computing a second derivative using one of a second derivative of the well log measurements and the last smoothed well log measurements at each sampled point; and f) identifying each second derivative with a zero value, which represents an inflection point.

The subject matter of the present disclosure is described with specificity, however, the description itself is not intended to limit the scope of the disclosure. The subject matter thus, might also be embodied in other ways, to include different structures, steps and/or combinations similar to those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries (e.g. drilling water wells) to achieve similar results.

Method Description

Figure 1:
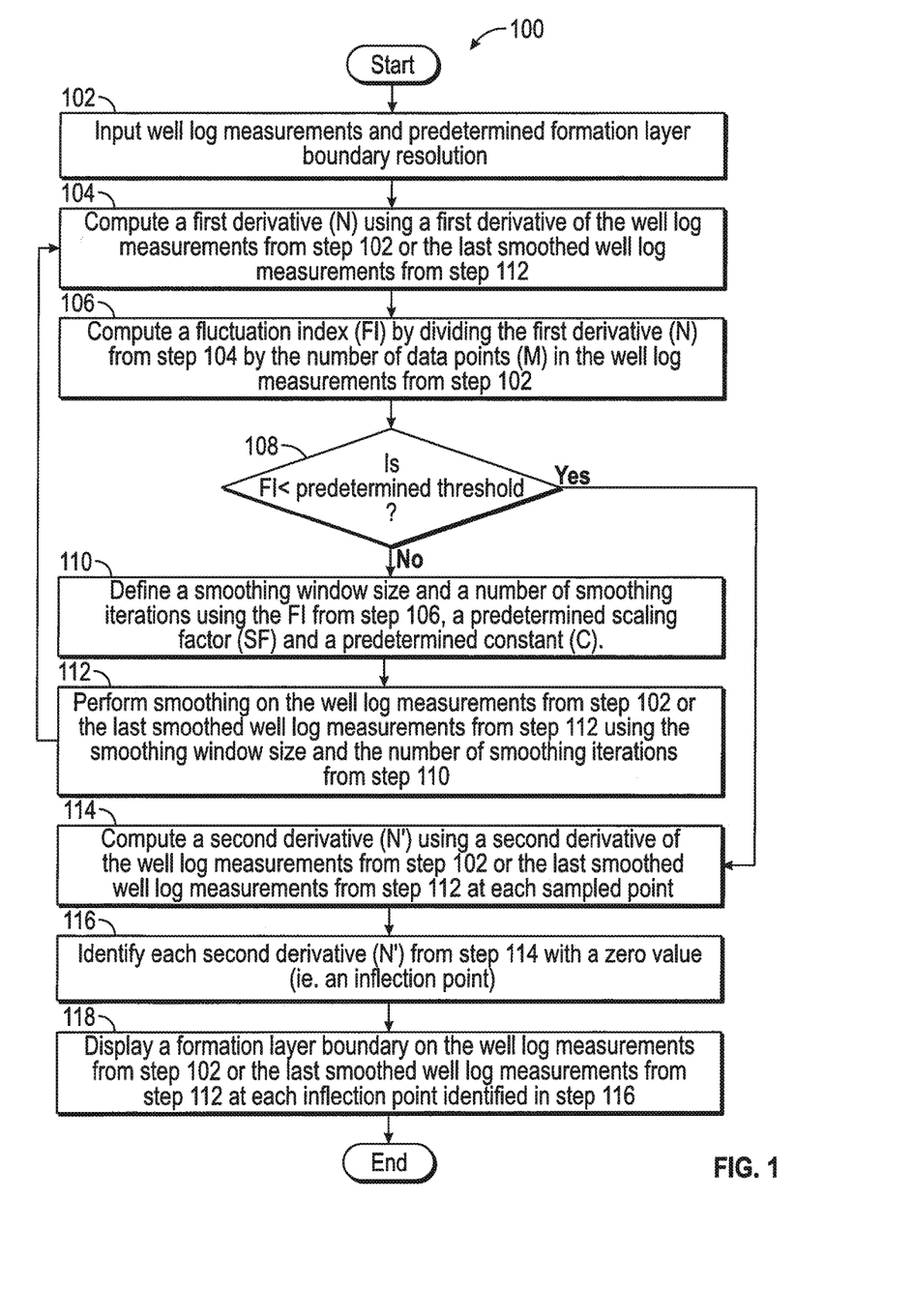
FIG. 1 is a flow diagram illustrating one embodiment of a method for implementing the present disclosure.

Referring now to FIG. 1, a flow diagram illustrates one embodiment of a method 100 for implementing the present disclosure. The method 100 enables the display of a layer boundary on the last smoothed well log measurements where each respective second derivative value is equal to zero. In this manner, the method 100 is based on a guided up-scaling of the data to be used for formation layer boundary detection. In order for the method 100 to be automatic, independent of the data resolution and input parameters, the up-scaling is adjusted automatically according to data resolution.

Figure 2:
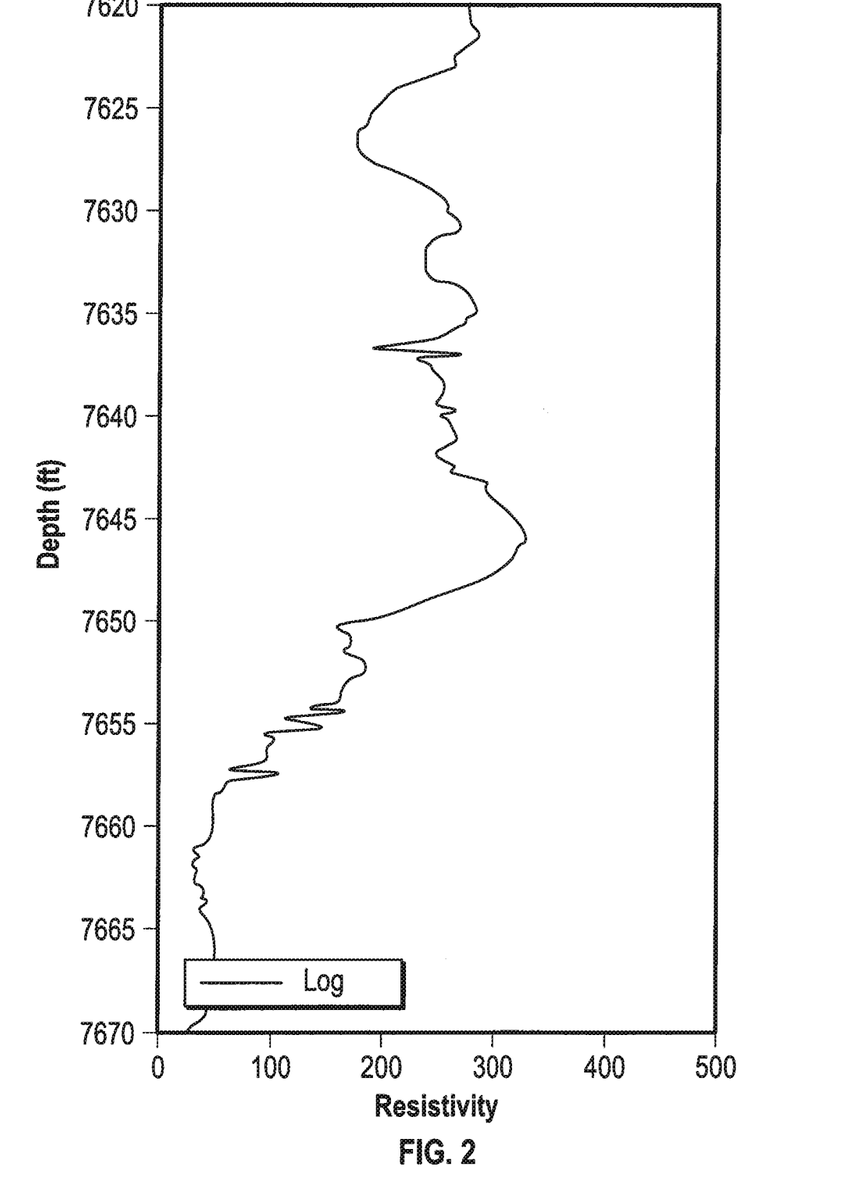
FIG. 2 is a well log illustrating synthetic (simulated) resistivity well log measurements used as exemplary input for step 102 in FIG. 1.
Figure 10:
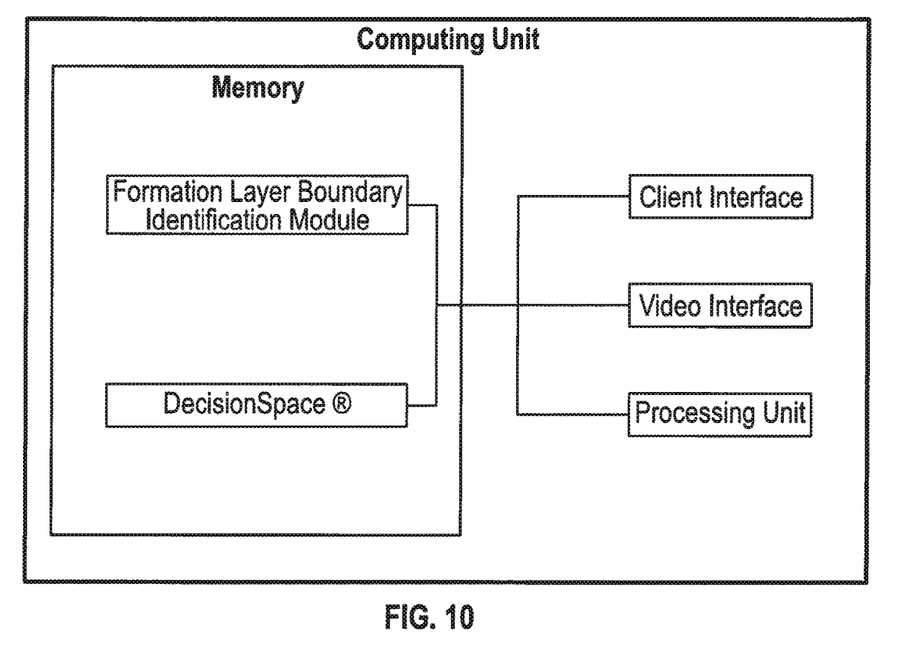
FIG. 10 is a block diagram illustrating one embodiment of a computer system for implementing the present disclosure.

In step 102, well log measurements from a well bore and a predetermined formation layer boundary resolution are input using the client interface and/or the video interface described further in reference to FIG. 10. The well log measurements may comprise, for example, resistivity or gamma ray measurements. And, the predetermined formation layer boundary resolution is a parameter representing the thickness (resolution) of the formation layer boundaries displayed in step 118. In FIG. 2, a well log illustrates synthetic resistivity well log measurements that may be used as exemplary input.

Figure 3:
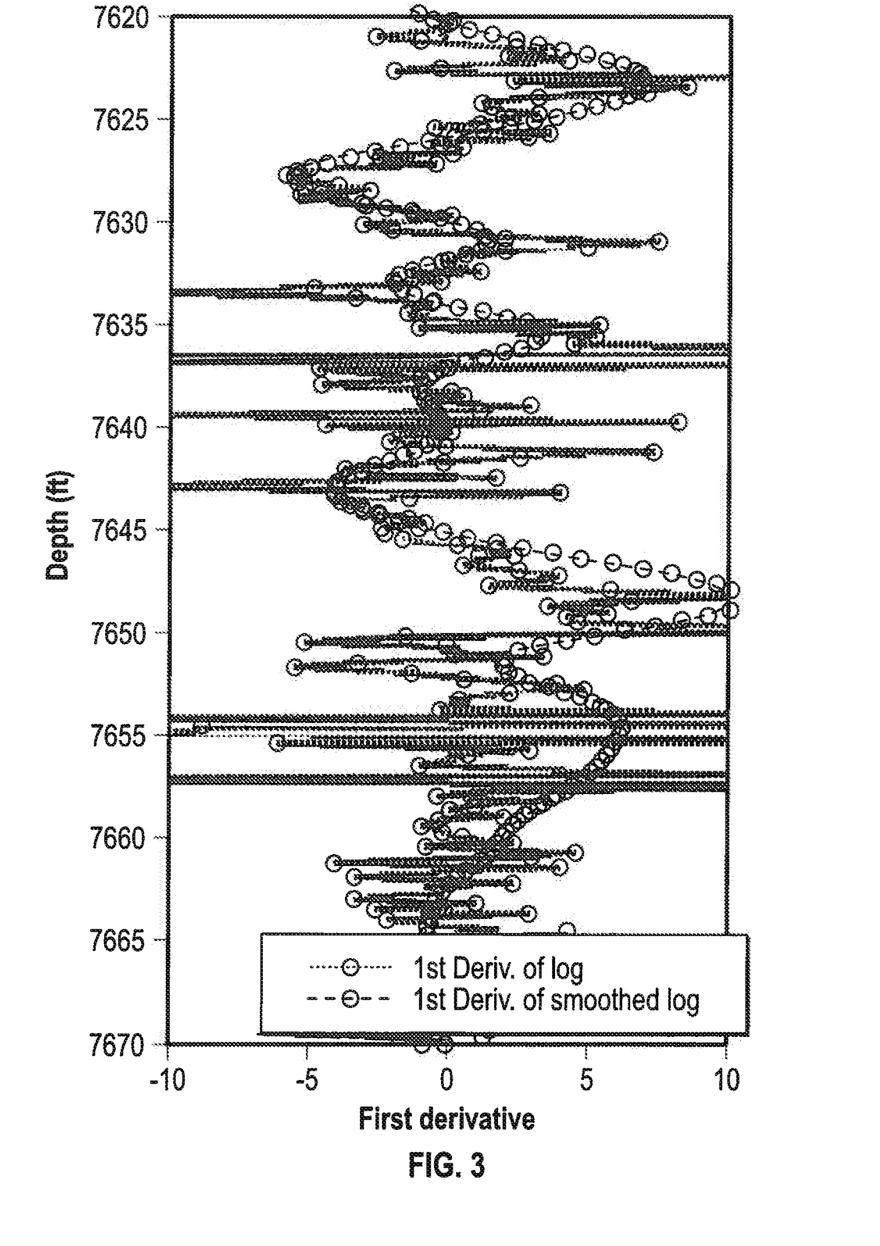
FIG. 3 is a first derivative well log illustrating a first derivative of the resistivity well log measurements in FIG. 2 and a first derivative of the last smoothed resistivity well log measurements in FIG. 2, which may be used in step 104 of FIG. 1.

In step 104, a number of peaks and troughs, which are also referred to as the number of zero crossings, is computed using a first derivative of the well log measurements from step 102 or the last smoothed well log measurements from step 112, and techniques well known in the art. In FIG. 3, a first derivative well log illustrates a first derivative of the resistivity well log measurements in FIG. 2 and a first derivative of the last smoothed resistivity well log measurements in FIG. 2 as a result of step 112.

In step 106, a fluctuation index (FI) is computed by dividing the number of peaks and troughs from step 104 by the number of data points (M) in the well log measurements from step 102.

In step 108, the method 100 determines if FI from step 106 is less than a predetermined threshold representing the optimal thickness (resolution) of the formation layer boundaries displayed in step 118. If FI is less than a predetermined threshold, then the method 100 proceeds to step 114. Otherwise, the method 100 proceeds to step 110.

In step 110, a smoothing window size and a number of smoothing iterations are defined using FI from step 106 a predetermined scaling factor (SF) and a predetermined constant (C). The smoothing window size is equal to FI*SF and the number of smoothing iterations is equal to FI*C. The larger the smoothing window, the better (more smooth) the results.

In step 112, smoothing is performed on the well log measurements from step 102 or the last smoothed well log measurements from step 112 using the smoothing window size and number of smoothing iterations from step 110, and smoothing techniques well-known in the art. The method returns to step 104 and repeats steps 104-112 until FI is less than the predetermined threshold.

Figure 4:
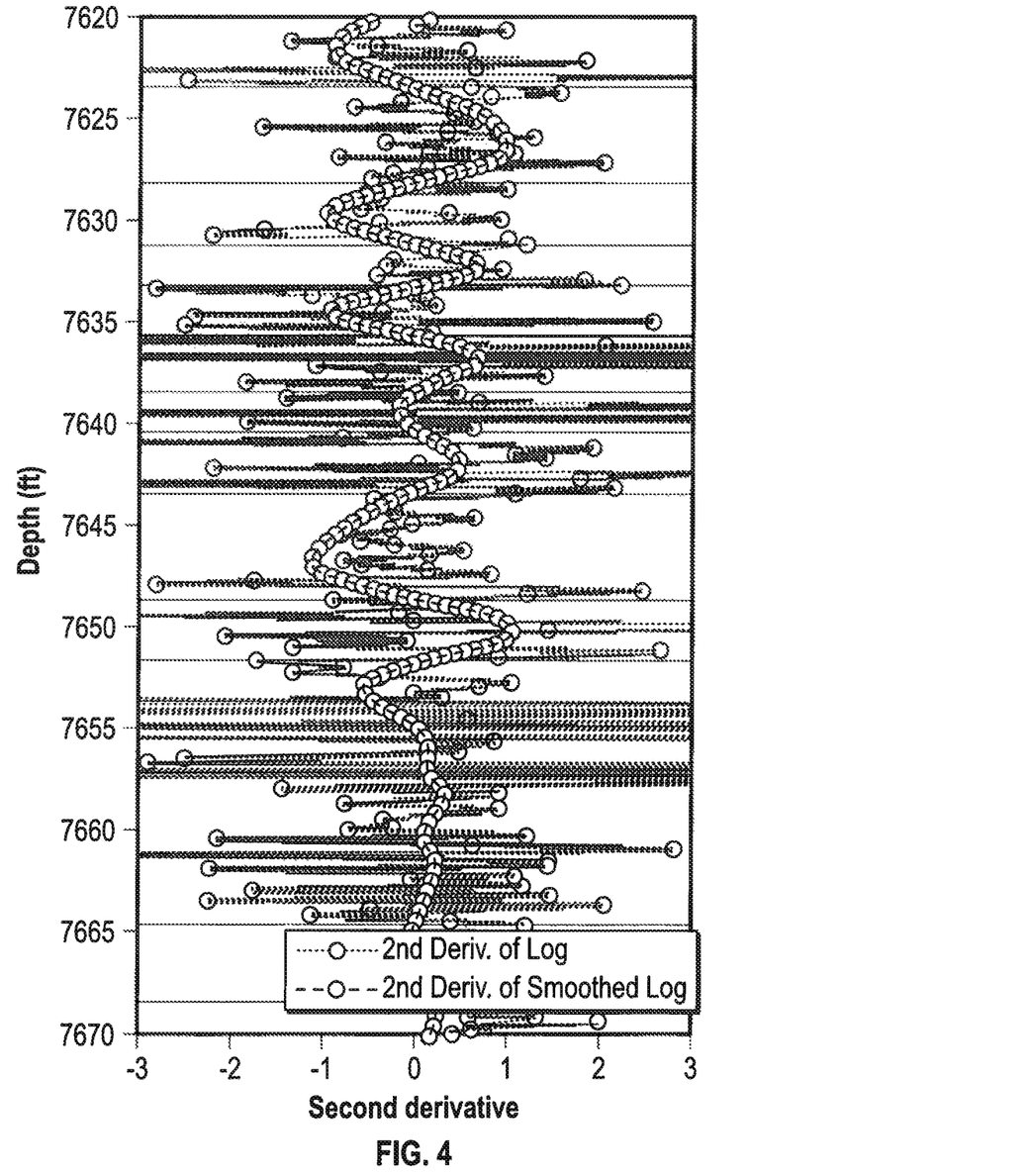
FIG. 4 is a second derivative well log illustrating a second derivative of the resistivity well log measurements in FIG. 2 and a second derivative of the last smoothed resistivity well log measurements in FIG. 2 at each sampled point, which may be used in step 114 of FIG. 1.

In step 114, a second derivative (N') is computed using a second derivative of the well log measurements from step 102 or the last smoothed well log measurements from step 112 at each sampled point, and techniques well-known in the art. The second derivative (N') thus, represents a value at each sampled point in the second derivative of the well log measurements from step 102 or the last smoothed well log measurements from step 112. If the second derivative (N') value is zero, then an inflection point is represented by the corresponding sampled point. In FIG. 4, a second derivative well log illustrates a second derivative of the resistivity well log measurements in FIG. 2 and a second derivative of the last smoothed resistivity well log measurements in FIG. 2 (as a result of step 112) at each sampled point.

In step 116, each second derivative (N') from step 114 with a zero value (i.e. an inflection point) is identified. Each inflection point represents a formation layer boundary.

In step 118, a formation layer boundary is displayed on the well log measurements from step 102 or the last smoothed well log measurements form step 112 at each inflection point identified in step 116 using the video interface described further in reference to FIG. 10. In FIG. 4, each solid horizontal line represents a formation layer boundary displayed according to the method 100. If the second derivative is computed in step 114 using the well log measurements from step 102, then many unwanted thin formation layer boundaries may be detected compared to if the second derivative is computed using the last smoothed well log measurements from step 112, which is more favorable for interpretation and modeling. The smoothing performed in step 112 thus, can remove small fluctuations from the data resulting in a reasonable number of inflection points identified in step 116. A good measure of the fluctuations is the number of peaks and troughs in the well log measurements from step 102, normalized by the number of data points.

Figure 5A:
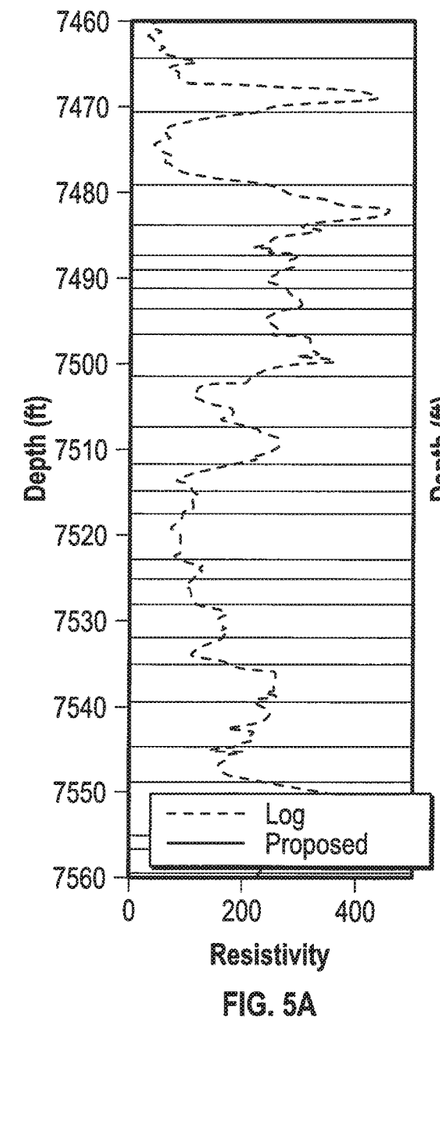
FIGS. 5A-5B are two well logs illustrating real resistivity well log measurements at a predetermined depth in a well bore and a comparison of the formation layer boundaries displayed in step 118 of FIG. 1 (FIG. 5A) with the formation layer boundaries displayed according to the well-known variance based (FIG. 5B).
Figure 5B:
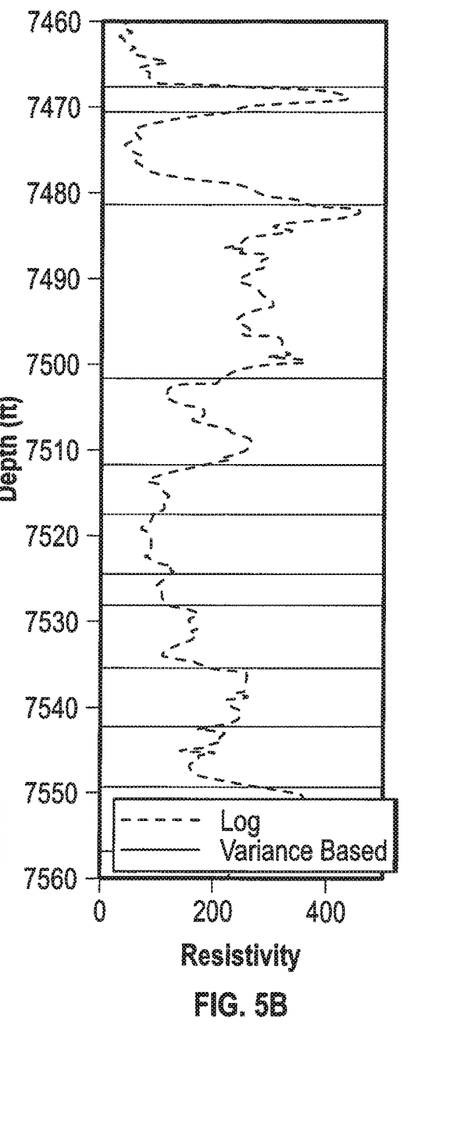
Figure 6A:
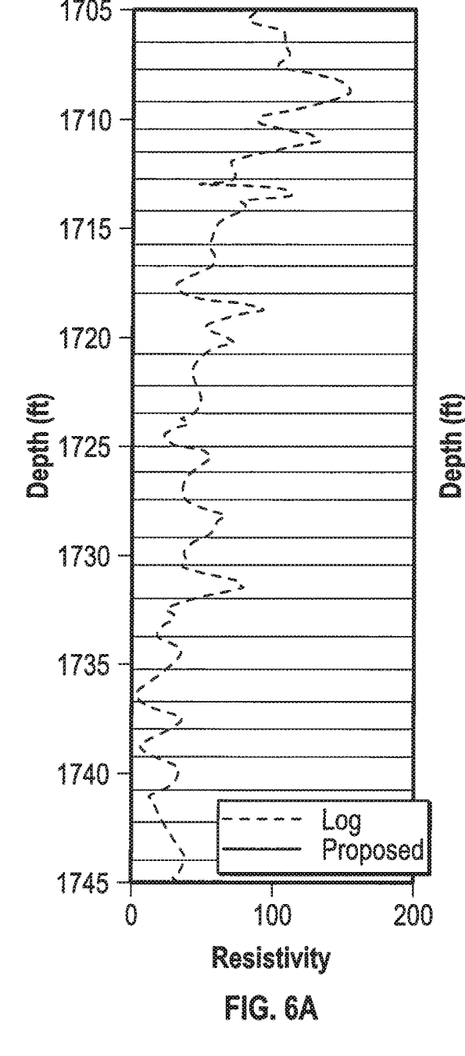
FIGS. 6A-6B are two well logs illustrating real resistivity well log measurements at another predetermined depth in the same well bore and a comparison of the formation layer boundaries displayed in step 118 of FIG. 1 (FIG. 6A) with the for nation layer boundaries displayed according to the well-known variance based (FIG. 6B).
Figure 6B:
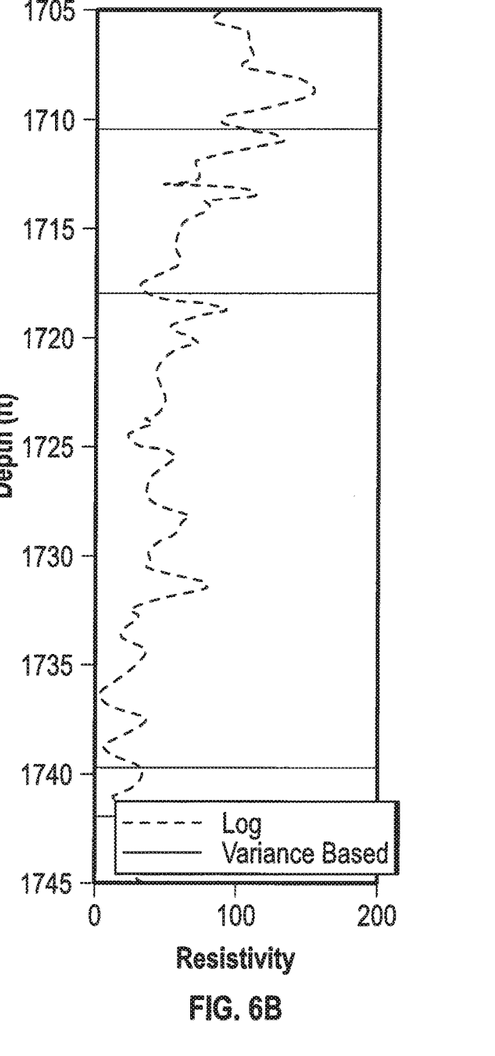
Figure 7A:
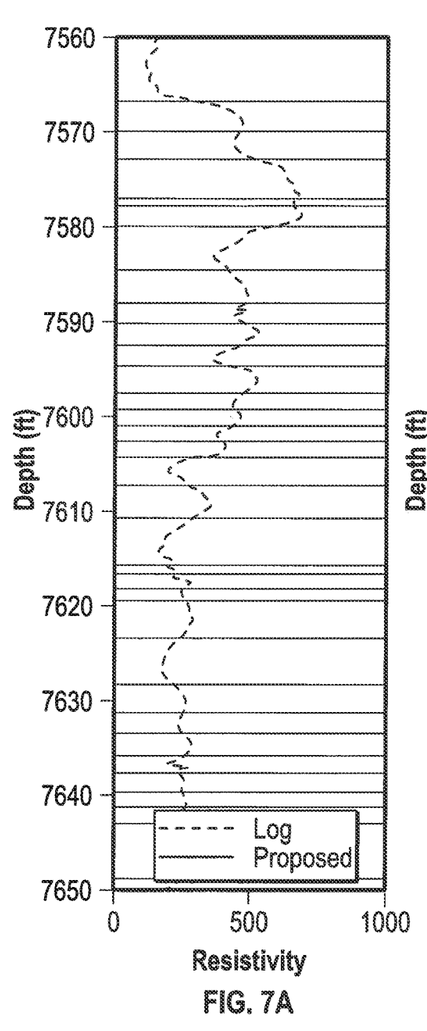
FIGS. 7A-7B are two well logs illustrating real resistivity well log measurements at still another predetermined depth in the same well bore and a comparison of the formation layer boundaries displayed in step 118 of FIG. 1 (FIG. 7A) with the formation layer boundaries displayed according to the well-known variance based (FIG. 7B).
Figure 7B:
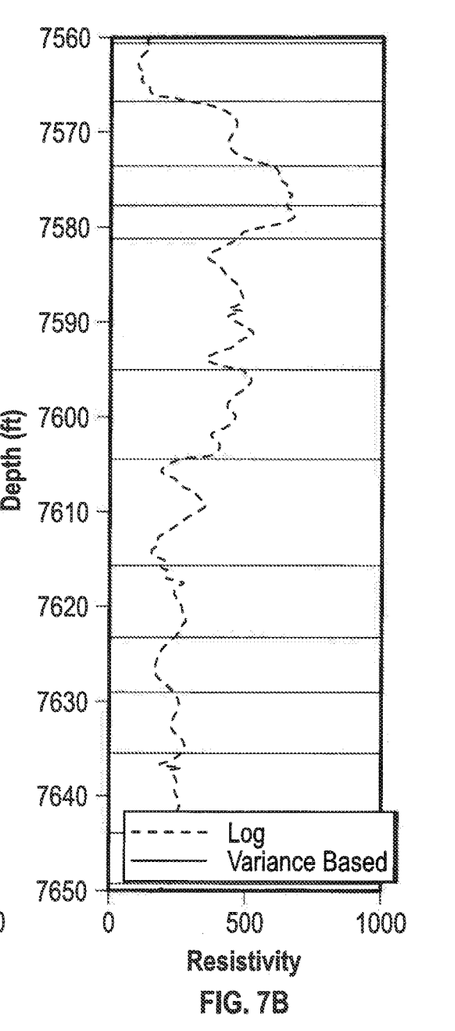
Figure 8A:
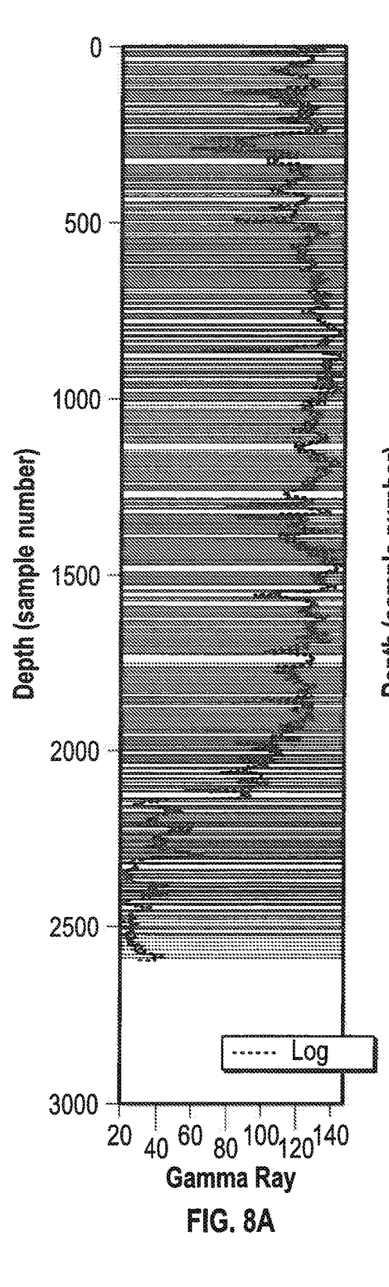
FIGS. 8A-8D are well logs illustrating real gamma ray well log measurements at a predetermined depth in a well bore and a comparison of the formation layer boundaries displayed in step 118 of FIG. 1 at different resolutions.
Figure 8B:
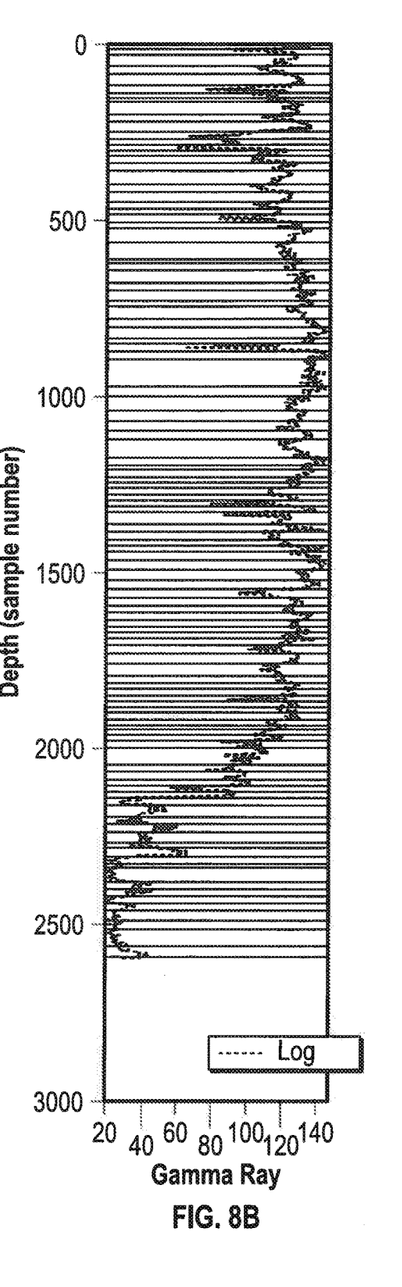
Figure 8C:
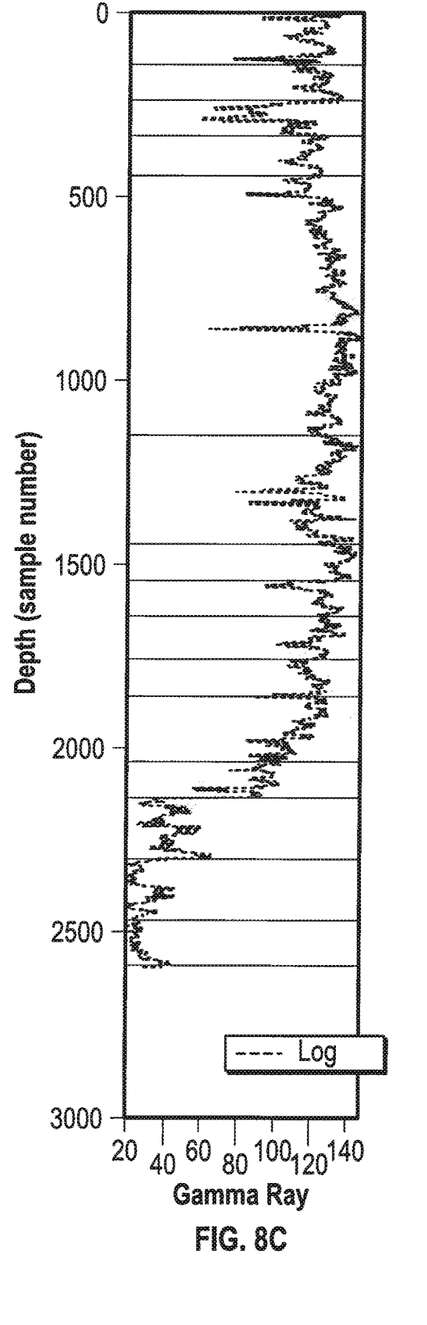
Figure 8D:
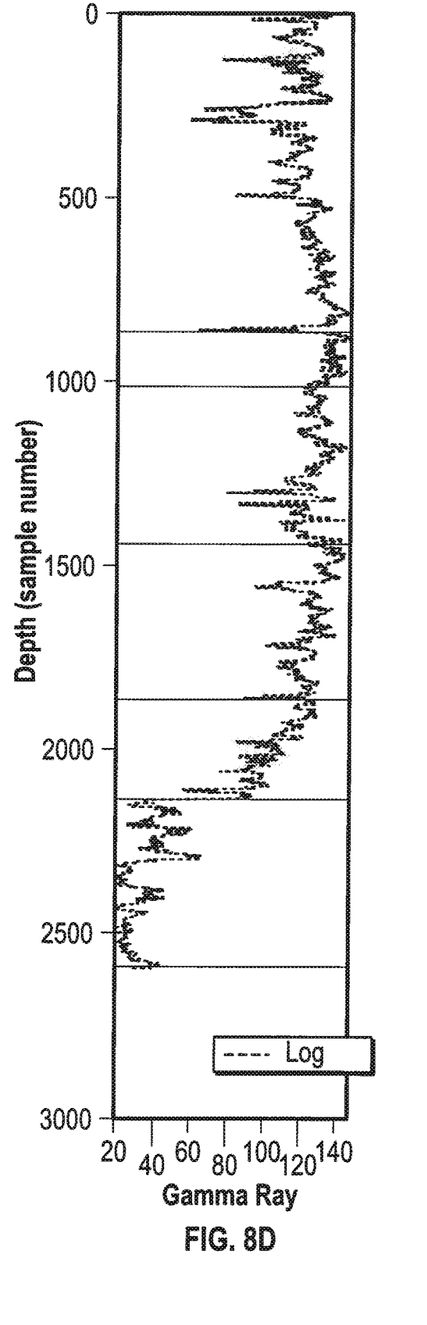
Figure 9A:
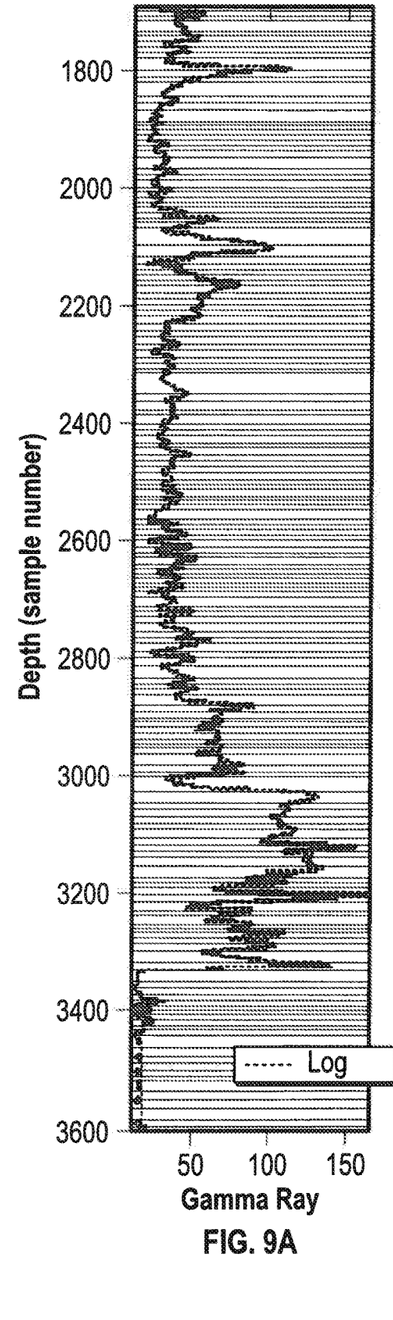
FIGS. 9A-9D are well logs illustrating real gamma ray well log measurements at a predetermined depth in a well bore and a comparison of the formation layer boundaries displayed in step 118 of FIG. 1 at different resolutions.
Figure 9B:
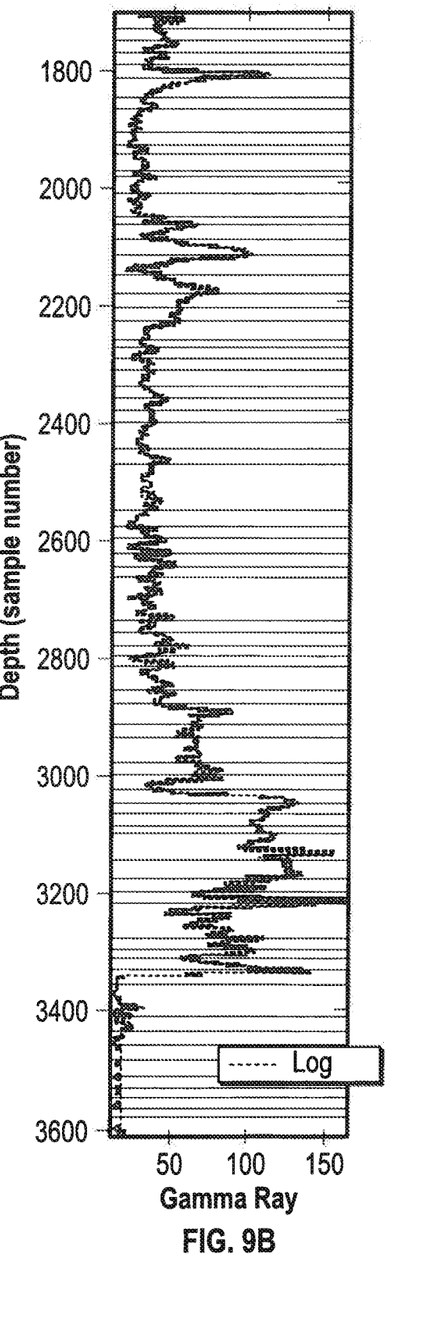
Figure 9C:
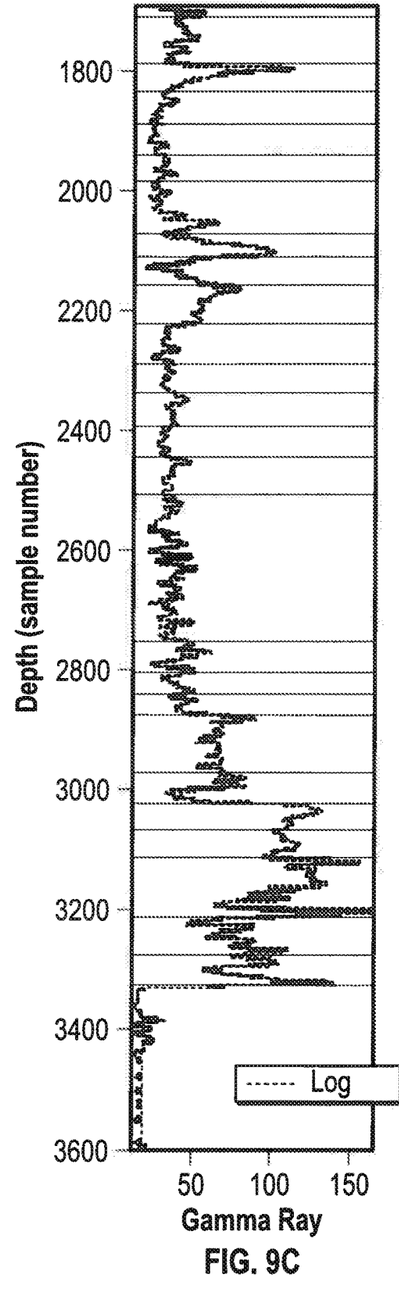
Figure 9D:
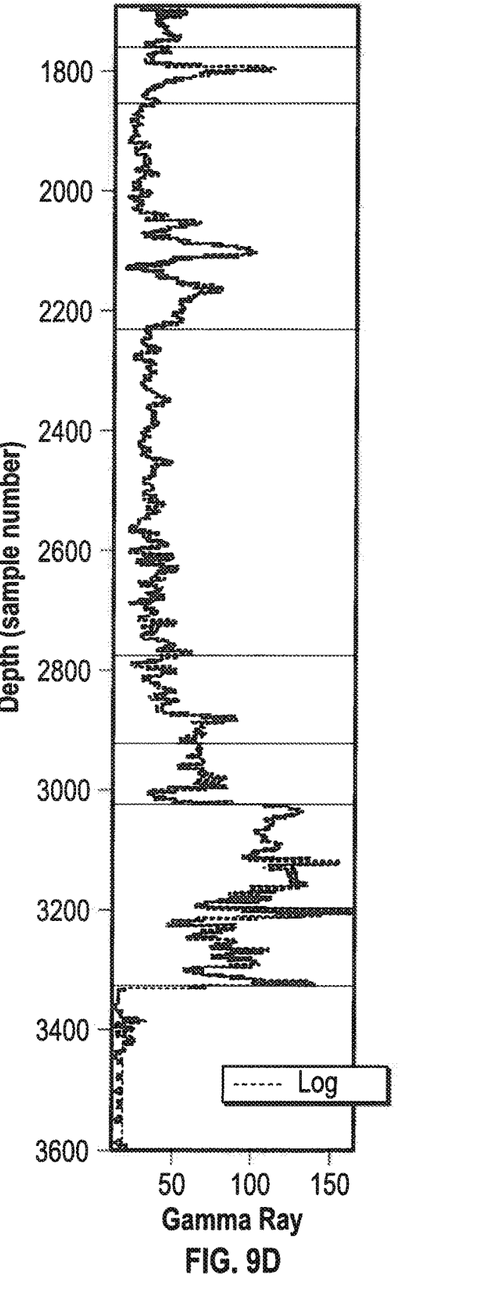

In FIGS. 5A-5B, two well logs illustrate real resistivity well log measurements (dashed lines) at a predetermined depth in a well bore and a comparison of the formation layer boundaries (solid horizontal lines) displayed in step 118 of FIG. 1 (FIG. 5A) with the formation layer boundaries (solid horizontal lines) displayed according to the well-known variance based (FIG. 5B). In FIGS. 6A-6B, two well logs illustrate real resistivity well log measurements (dashed lines) at another predetermined depth in the same well bore and a comparison of the formation layer boundaries (solid horizontal lines) displayed in step 118 of FIG. 1 (FIG. 6A)

with the formation layer boundaries (solid horizontal lines) displayed according to the well-known variance based (FIG. 6B). In FIGS. 7A-7B, two well logs illustrate real resistivity well log measurements (dashed lines) at still another predetermined depth in the same well bore and a comparison of the formation layer boundaries (solid horizontal lines) displayed in step 118 of FIG. 1 (FIG. 7A) with the formation layer boundaries (solid horizontal lines) displayed according to the well-known variance based (FIG. 7B). As demonstrated by these figures, the method 100 is capable of identifying more actual formation layer boundaries on well log measurements than the popular variance based method.

In FIGS. 8A-8D, the well logs illustrate real gamma ray well log measurements (dashed lines) at a predetermined depth in a well bore and a comparison of the formation layer boundaries (solid horizontal lines) displayed in step 118 of FIG. 1 at different resolutions. In FIGS. 9A-9D, the well logs illustrate real gamma ray well log measurements (dashed lines) at a predetermined depth in a well bore and a comparison of the formation layer boundaries (solid horizontal lines) displayed in step 118 of FIG. 1 at different resolutions. As demonstrated by these figures, the predetermined formation layer boundary resolution parameter in step 102 is capable of adjusting the thickness (resolution) of the formation layer boundaries displayed in step 118. The method 100 is thus, useful for interpretation and processing of different petrophysical and geophysical data that may lead to more efficient drilling operations through the adjustment of the same based on the location of the formation layer boundaries.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-9. The memory therefore, includes a formation layer boundary identification module, which enables steps 104-118 described in reference to FIG. 1. The formation layer boundary identification module may integrate functionality from the remaining application programs illustrated in FIG. 10. In particular, DecisionSpace® may be used as an interface application to perform step 102 in FIG. 1. Although DecisionSpace® may be used as interface application, other interface applications may be used, instead, or the formation layer boundary identification module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for identifying formation layer boundaries on well log measurements, which comprises:
   a) computing a number of peaks and troughs using one of a first derivative of the well log measurements and last smoothed well log measurements, the well log measurements and the last smoothed well log measurements comprising a number of data points;
   b) computing a fluctuation index by dividing the number of peaks and troughs by the number of data points in the well log measurements;
   c) smoothing one of the well log measurements and the last smoothed well log measurements using a computer processor;
   d) repeating steps a)-c) until the fluctuation index is less than a predetermined threshold;
   e) computing a value at each sampled point using one of a second derivative of the well log measurements and the last smoothed well log measurements;
   f) identifying each value with a zero value, which represents an inflection point;
   g) displaying a formation layer boundary on one of the well log measurements and the last smoothed well log measurements at each identified inflection point; and
   h) adjusting one or more drilling operations based on each displayed formation layer boundary.

2. The method of claim 1, wherein the well log measurements comprise one of resistivity and gamma ray measurements.

3. The method of claim 1, wherein the predetermined threshold represents an optimal formation layer boundary resolution.

4. The method of claim 1 further comprising adjusting the predetermined threshold.

5. The method of claim 1, wherein the smoothing is based on a smoothing window size and a number of smoothing iterations.

6. The method of claim 5, wherein the smoothing window size is determined by multiplying the fluctuation index by a predetermined scaling factor.

7. The method of claim 5, wherein the number of smoothing iterations is determined by multiplying the fluctuation index by a predetermined constant.

8. A non-transitory program carrier device tangibly carrying computer executable instructions for identifying formation layer boundaries on well log measurements, the instructions being executable to implement:
   a) computing a number of peaks and troughs using one of a first derivative of the well log measurements and last smoothed well log measurements, the well log measurements and the last smoothed well log measurements comprising a number of data points;
   b) computing a fluctuation index by dividing the number of peaks and troughs by the number of data points in the well log measurements;
   c) smoothing one of the well log measurements and the last smoothed well log measurements using a computer processor;
   d) repeating steps a)-c) until the fluctuation index is less than a predetermined threshold;
   e) computing a value at each sampled point using one of a second derivative of the well log measurements and the last smoothed well log measurements;
   f) identifying each value with a zero value, which represents an inflection point;
   g) displaying a formation layer boundary on one of the well log measurements and the last smoothed well log measurements at each identified inflection point; and
   h) adjusting one or more drilling operations based on each displayed formation layer boundary.

9. The method of claim 8, wherein the well log measurements comprise one of resistivity and gamma ray measurements.

10. The method of claim 8, wherein the predetermined threshold represents an optimal formation layer boundary resolution.

11. The method of claim 8 further comprising adjusting the predetermined threshold.

12. The method of claim 8, wherein the smoothing is based on a smoothing window size and a number of smoothing iterations.

13. The method of claim 12, wherein the smoothing window size is determined by multiplying the fluctuation index by a predetermined scaling factor.

14. The method of claim 12, wherein the number of smoothing iterations is determined by multiplying the fluctuation index by a predetermined constant.

15. A non-transitory program carrier device tangibly carrying computer executable instructions for identifying formation layer boundaries on well log measurements, the instructions being executable to implement:
   a) computing a number of peaks and troughs using one of a first derivative of the well log measurements and last smoothed well log measurements, the well log measurements and the last smoothed well log measurements comprising a number of data points;
   b) computing a fluctuation index by dividing the number of peaks and troughs by the number of data points in the well log measurements;

c) smoothing one of the well log measurements and the last smoothed well log measurements using a computer processor;
d) repeating steps a)-c) until the fluctuation index is less than a predetermined threshold, wherein the predetermined threshold represents an optimal formation layer boundary resolution;
e) computing a value at each sampled point using one of a second derivative of the well log measurements and the last smoothed well log measurements;
f) identifying each value with a zero value, which represents an inflection point;
g) displaying a formation layer boundary on one of the well log measurements and the last smoothed well log measurements at each identified inflection point; and
h) adjusting one or more drilling operations based on each displayed formation layer boundary.

16. The method of claim 15, wherein the smoothing is based on a smoothing window size and a number of smoothing iterations.

17. The method of claim 16, wherein the smoothing window size is determined by multiplying the fluctuation index by a predetermined scaling factor.

18. The method of claim 16, wherein the number of smoothing iterations is determined by multiplying the fluctuation index by a predetermined constant.

* * * * *